(12) United States Patent
Singh et al.

(10) Patent No.: US 10,891,438 B2
(45) Date of Patent: Jan. 12, 2021

(54) DEEP LEARNING TECHNIQUES BASED MULTI-PURPOSE CONVERSATIONAL AGENTS FOR PROCESSING NATURAL LANGUAGE QUERIES

(71) Applicant: Tata Consultancy Services Limited, Mumbai (IN)

(72) Inventors: Mahesh Prasad Singh, Noida (IN); Puneet Agarwal, Noida (IN); Ashish Chaudhary, Noida (IN); Gautam Shroff, Noida (IN); Prerna Khurana, Noida (IN); Mayur Patidar, Noida (IN); Vivek Bisht, Noida (IN); Rachit Bansal, Noida (IN); Prateek Sachan, Noida (IN); Rohit Kumar, Noida (IN)

(73) Assignee: Tata Consultancy Services Limited, Mumbai (IN)

( * ) Notice: Subject to any disclaimer, the term of this patent is extended or adjusted under 35 U.S.C. 154(b) by 163 days.

(21) Appl. No.: 16/384,316

(22) Filed: Apr. 15, 2019

(65) Prior Publication Data
US 2019/0317994 A1   Oct. 17, 2019

(30) Foreign Application Priority Data
Apr. 16, 2018   (IN) .............................. 201821014473

(51) Int. Cl.
*G06F 40/30*   (2020.01)
*G06N 20/00*   (2019.01)

(52) U.S. Cl.
CPC ............. *G06F 40/30* (2020.01); *G06N 20/00* (2019.01)

(58) Field of Classification Search
None
See application file for complete search history.

(56) References Cited

U.S. PATENT DOCUMENTS 9,189,742 B2   11/2015  London
9,369,410 B2   6/2016   Capper et al.
(Continued)

FOREIGN PATENT DOCUMENTS

WO   WO-2017/222840   12/2017

OTHER PUBLICATIONS

Nazir, A. (May 2017). "Seamless Automation and Integration of Machine Learning Capabilities for Big Data Analytics," *International Journal of Distributed and Parallel Systems (IJDPS)*, vol. 8, No. 3; pp. 1-18.

(Continued)

*Primary Examiner* — Neeraj Sharma
(74) *Attorney, Agent, or Firm* — Finnegan, Henderson, Farabow, Garrett & Dunner LLP

(57) ABSTRACT

Systems and methods for Deep Learning techniques based multi-purpose conversational agents for processing natural language queries. The traditional systems and methods provide for conversational systems for processing natural language queries but do not employ Deep Learning techniques, and thus are unable to process large number of intents. Embodiments of the present disclosure provide for Deep Learning techniques based multi-purpose conversational agents for processing the natural language queries by defining and logically integrating a plurality of components comprising of multi-purpose conversational agents, identifying an appropriate agent to process one or more natural language queries by a High Level Intent Identification technique, predicting a probable user intent, classifying the query, and generate a set of responses by querying or updating one or more knowledge graphs.

15 Claims, 11 Drawing Sheets

(56) References Cited

U.S. PATENT DOCUMENTS

| | | | | |
|---|---|---|---|---|
| 9,966,065 | B2* | 5/2018 | Gruber | G10L 15/1822 |
| 10,418,032 | B1* | 9/2019 | Mohajer | G06F 16/3329 |
| 2002/0156756 | A1* | 10/2002 | Stanley | G06F 16/20 |
| | | | | 706/47 |
| 2011/0238409 | A1* | 9/2011 | Larcheveque | G10L 15/1815 |
| | | | | 704/9 |
| 2014/0344213 | A1* | 11/2014 | Kent | G06Q 50/01 |
| | | | | 707/608 |
| 2015/0066479 | A1* | 3/2015 | Pasupalak | G06F 40/20 |
| | | | | 704/9 |
| 2017/0083285 | A1 | 3/2017 | Meyers et al. | |
| 2018/0129958 | A1* | 5/2018 | Saxena | G06Q 20/3825 |
| 2018/0176269 | A1* | 6/2018 | Griffin | H04L 65/403 |
| 2018/0196812 | A1* | 7/2018 | Gupta | G06F 40/284 |
| 2018/0268818 | A1* | 9/2018 | Schoenmackers | G10L 15/26 |
| 2018/0300310 | A1* | 10/2018 | Shinn | G06F 40/289 |
| 2019/0012714 | A1* | 1/2019 | Bright | G06Q 30/0617 |
| 2019/0164082 | A1* | 5/2019 | Wu | G06Q 50/01 |
| 2019/0213284 | A1* | 7/2019 | Anand | G06F 9/453 |

OTHER PUBLICATIONS

Nixon, B. et al. (May 2015). "Learning Knowledge Graphs for Question Answering through Conversational Dialog," *Human Language Technologies: The 2015 Annual Conference of the North American Chapter of the ACL*, Denver, Colorado, pp. 851-861.

Mathur, V. et al. (Mar. 2018). "The Rapidly Changing Landscape of Conversational Agents," retrieved from https://arxiv.org/pdf/1803.08419.pdf; pp. 1-14.

Austin, T. et al. (Sep. 2016). "Conversational AI to Shake Up Your Technical and Business Worlds," retrieved from http://torquex.com.au/wp-content/uploads/2017/02/Conversational-AI-to-Shake-Up-Your-Technical-and-Business-Worlds.pdf; 21 pages.

\* cited by examiner

Performing, based upon the predicted user intent and the identified multi-purpose conversational agent, one of: (i) selecting one or more pre-defined set of responses amongst a plurality of pre-defined set of responses or engaging a user for extracting in-depth information or calling external APIs for communicating the in-depth information to one or more external services upon determining the identified multi-purpose conversational agent to be corresponding IAD Framework, wherein the one or more pre-defined set of responses and the in-depth information correspond to the set of natural language queries; or (ii) classifying a query amongst the set of natural language queries to identify one or more categories of conversations by implementing a recurrent neural network technique upon determining the identified multi-purpose conversational agent to be corresponding to the QUE Framework; and (iii) performing, based upon the classified query, one of : (a) querying one or more knowledge graphs to generate a first set of responses corresponding to the set of natural language queries; or (b) updating, by a Knowledge Graph Update-Natural Language (KGU-NL) Agent, the one or more knowledge graphs to generate a second set of responses corresponding to the set of natural language queries.

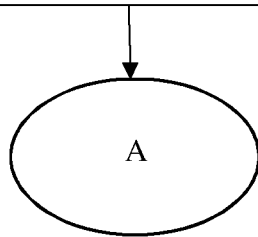

FIG. 2C

| Console | | | | |
|---|---|---|---|---|
| Home | Help | Welcome XYZ | | Logout |

Virtual Assistance
Create

Knowledge Synthesis
Create

Agent Name: Finance
Agent Type: Advance

Select Agent Type
Basic
Advance

Training File Type
Select File Type
Master
Dialogue
Pattern
Policy Document

| Select File | | Upload |
|---|---|---|
| Select File | Mas_Adv.....plate.xls | Upload |

High Level Intent Identification

Finance Agent Advanced

Edit
Delete
Web Host

Status

Ready

Running

FIG. 7

DEEP LEARNING TECHNIQUES BASED MULTI-PURPOSE CONVERSATIONAL AGENTS FOR PROCESSING NATURAL LANGUAGE QUERIES

PRIORITY CLAIM

This U.S. patent application claims priority under 35 U.S.C. § 119 to India Application No. 201821014473, filed on Apr. 16, 2018. The entire contents of the aforementioned application are incorporated herein by reference.

DESCRIPTION

Technical Field

The disclosure herein generally relates to Deep Learning techniques based multi-purpose conversational agents for processing natural language queries, and, more particularly, to systems and methods for Deep Learning techniques based multi-purpose conversational agents for processing natural language queries.

Background

Natural language processing (NLP) is a sub-field of artificial intelligence and linguistics. The NLP facilitates resolving the problems corresponding to automated generation and understanding of natural human languages. Natural language generation systems convert information from computer databases into normal-sounding human language, and natural language understanding systems convert samples of human language into more formal representations that are easier for computer programs to manipulate. Recent advances in natural language processing, especially implementing deep learning techniques has resulted in the availability of variety of platforms to support dialogue-based applications (e.g. API.ai, etc.) as well as research in learning from and generating meaningful dialogue to engage users. Most these traditional systems and methods however, serve transactional purposes, such as interacting with one's bank or making travel bookings, and/or general purpose question-answering.

A natural language interface is expected to be user-friendly and the user must be able to use the same without training. However, in reality, this may not be the case. This is primarily because a computing system reacts well enough to only predefined types of conversations. Another important challenge is that for every different user dialogue, different set of information may to be extracted from user utterances, for example, obtaining employee or leave start/end dates. Writing a different information extractor for every requirement is a big challenge as a general purpose information extractor is far from reality even in view of advanced deep learning approaches.

Further, the machine learning or deep learning techniques must not only identify user intent, but also predict whether the confidence of a machine learning model on intent identification is high enough for the computing system to believe it and proceed. Finally, it takes a lot of effort to create training data for processing natural language queries by agents. It may require a number of experts of the domain of that particular agent(s). Due to a limited number of people work to creating initial training data, the actual user queries may vary from those present in the training data as there may be a plurality of variations of a sentence carrying the same meaning. Hence, creating a robust system that provides for a virtual assistance, when the available training data is very limited in quantity is cumbersome and challenging.

SUMMARY

Embodiments of the present disclosure present technological improvements as solutions to one or more of the above-mentioned technical problems recognized by the inventors in conventional systems. For example, in one embodiment, a method for Deep Learning techniques based multi-purpose conversational agents for processing the natural language queries is provided, the method comprising: defining, a plurality of components comprising of a Dialogue State Manager (DSM), a Multi-level Intent Identification Component, an Agents Manager, a plurality of Primary Agents, an Intent-Action-Dialogue (IAD) Framework, a Query-Update-Engage (QUE) Framework, a Knowledge Graph Update-Natural Language (KGU-NL) Agent, a Knowledge Graph Engage Agent, a plurality of Auxiliary Agents, and a Knowledge Graph Update Agent, wherein each component amongst the plurality of components comprises one or more multi-purpose conversational agents; logically integrating, based upon a set of anticipated natural language user queries, the plurality of components by one or more application programming interfaces (APIs); receiving, by the plurality of components logically integrated, a set of natural language queries from a plurality of sources; performing, based upon the set of natural language queries, a plurality of steps, wherein the plurality of steps comprise: (i) identifying at least one multi-purpose conversational agent amongst the one or more multi-purpose conversational agents by using the DSM, wherein the identified multi-purpose conversational agent corresponds to either the IAD Framework or the QUE Framework; and (ii) predicting, by using one or more Deep Learning techniques, a probable user intent against a user query amongst the set of non-classified natural language queries; performing, based upon the predicted user intent and the identified multi-purpose conversational agent, one of: (i) selecting one or more pre-defined set of responses amongst a plurality of pre-defined set of responses or engaging a user for extracting in-depth information or calling external APIs for communicating the in-depth information to one or more external services upon determining the identified multi-purpose conversational agent to be corresponding to the IAD Framework, wherein the one or more predefined set of responses and the in-depth information correspond to the set of natural language queries; or (ii) classifying a query amongst the set of natural language queries to identify one or more categories of conversations by implementing a recurrent neural network technique upon determining the identified multi-purpose conversational agent to be corresponding to the QUE Framework; and performing, based upon the classified query, one of: (a) querying one or more knowledge graphs to generate a first set of responses corresponding to the set of natural language queries; or (b) updating, by the KGU-NL Agent, the one or more knowledge graphs to generate a second set of responses corresponding to the set of natural language queries; hierarchically defining, based upon the set of anticipated natural language user queries, the plurality of components and the one or more multi-purpose conversational agents to process the natural language queries; auto-generating, based upon one or more training datasets, a plurality of recommended questions for one or more users to facilitate the processing of natural language queries; updated the one or more knowledge graphs by the Knowledge Graph Update Agent based upon a set of information obtained from one or more users by the Knowledge Graph Engage Agent, and wherein the set of information corresponds to the processing of natural language queries; obtaining the set of information from the one or more users by either a pro-active user engagement or by an analysis of information corresponding to the one or more knowledge graphs by the Knowledge Graph Engage Agent; generating the first set of responses by: (i) mapping one or more entities corresponding to the one or more knowledge graphs with one or more phrases corresponding to the classified query by an inverted index based searching technique; and (ii) traversing, based upon the mapping, the one or more knowledge graphs to generate the first set of responses; and generating the second set of responses by either engaging the user to extract the in-depth information corresponding to the set of natural language queries or by executing a set of commands by an interface.

In another aspect, there is provided a system for Deep Learning techniques based multi-purpose conversational agents for processing the natural language queries, the system comprising a memory storing instructions; one or more communication interfaces; and one or more hardware processors coupled to the memory via the one or more communication interfaces, wherein the one or more hardware processors are configured by the instructions to: define, a plurality of components comprising of a Dialogue State Manager (DSM), a Multi-level Intent Identification Component, an Agents Manager, a plurality of Primary Agents, an Intent-Action-Dialogue (IAD) Framework, a Query-UpdateEngage (QUE) Framework, a Knowledge Graph Update-Natural Language (KGU-NL) Agent, a Knowledge Graph Engage Agent, a plurality of Auxiliary Agents, and a Knowledge Graph Update Agent, wherein each component amongst the plurality of components comprises one or more multi-purpose conversational agents; logically integrate, based upon a set of anticipated natural language user queries, the plurality of components by one or more application programming interfaces (APIs); receive, by the plurality of components logically integrated, a set of natural language queries from a plurality of sources; perform, based upon the set of natural language queries, a plurality of steps, wherein the plurality of steps comprise: (i) identify at least one multi-purpose conversational agent amongst the one or more multi-purpose conversational agents by using the DSM, wherein the identified multi-purpose conversational agent corresponds to either the IAD Framework or the QUE Framework; and predict, by using one or more Deep Learning techniques, (ii) a probable user intent against a user query amongst the set of non-classified natural language queries; perform, based upon the predicted user intent and the identified multi-purpose conversational agent, one of: (i) select one or more pre-defined set of responses amongst a plurality of pre-defined set of responses or engaging a user for extracting in-depth information or calling external APIs for communicating the in-depth information to one or more external services upon determining the identified multi-purpose conversational agent to be corresponding to the IAD Framework, wherein the one or more pre-defined set of responses and the in-depth information correspond to the set of natural language queries; or (ii) classify a query amongst the set of natural language queries to identify one or more categories of conversations by implementing a recurrent neural network technique upon determining the identified multi-purpose conversational agent to be corresponding to the QUE Framework; and (iii) perform, based upon the classified query, one of: (a) query one or more knowledge graphs to generate a first set of responses corresponding to the set of natural language queries; or (b) update, by the KGU-NL Agent, the one or more knowledge graphs to generate a second set of responses corresponding to the set of natural language queries; hierarchically defining, based upon the set of anticipated natural language user queries, the plurality of components and the one or more multi-purpose conversational agents to process the natural language queries; auto-generate, based upon one or more training datasets, a plurality of recommended questions for one or more users to facilitate the processing of natural language queries; update the one or more knowledge graphs by implementing the Knowledge Graph Update Agent based upon a set of information obtained from one or more users, wherein the set of information corresponds to the processing of natural language queries, and wherein the set of information is obtained using the Knowledge Graph Engage Agent; obtaining the set of information from the one or more users by either a pro-active user engagement or by an analysis of information corresponding to the one or more knowledge graphs by the Knowledge Graph Engage Agent; generate the first set of responses by: (i) mapping one or more entities corresponding to the one or more knowledge graphs with one or more phrases corresponding to the classified query by an inverted index based searching technique; and (ii) traversing, based upon the mapping, the one or more knowledge graphs to generate the first set of responses; and generate the second set of responses by either engaging the user to extract the in-depth information corresponding to the set of natural language queries or by executing a set of commands by an interface.

In yet another aspect, there is provided one or more non-transitory machine readable information storage mediums comprising one or more instructions which when executed by one or more hardware processors causes the one or more hardware processors to perform a method for Deep Learning techniques based multi-purpose conversational agents for processing the natural language queries, the method comprising: defining, a plurality of components comprising of a Dialogue State Manager (DSM), a Multi-level Intent Identification Component, an Agents Manager, a plurality of Primary Agents, an Intent-Action-Dialogue (IAD) Framework, a Query-Update-Engage (QUE) Framework, a Knowledge Graph Update-Natural Language (KGU-NL) Agent, a Knowledge Graph Engage Agent, a plurality of Auxiliary Agents, and a Knowledge Graph Update Agent, wherein each component amongst the plurality of components comprises one or more multi-purpose conversational agents; logically integrating, based upon a set of anticipated natural language user queries, the plurality of components by one or more application programming interfaces (APIs); receiving, by the plurality of components logically integrated, a set of natural language queries from a plurality of sources; performing, based upon the set of natural language queries, a plurality of steps, wherein the plurality of steps comprise: (i) identifying at least one multi-purpose conversational agent amongst the one or more multi-purpose conversational agents by using the DSM, wherein the identified multi-purpose conversational agent corresponds to either the IAD Framework or the QUE Framework; and (ii) predicting, by using one or more Deep Learning techniques, a probable user intent against a user query amongst the set of non-classified natural language queries; performing, based upon the predicted user intent and the identified multi-purpose conversational agent, one of: (i) selecting one or more pre-defined set of responses amongst a plurality of pre-defined set of responses or engaging a user for extracting in-depth information or calling external APIs for communicating the in-depth information to one or more external services upon determining the identified multi-purpose conversational agent to be corresponding to the IAD Framework, wherein the one or more pre-defined set of responses and the in-depth information correspond to the set of natural language queries; or (ii) classifying a query amongst the set of natural language queries to identify one or more categories of conversations by implementing a recurrent neural network technique upon determining the identified multi-purpose conversational agent to be corresponding to the QUE Framework; and performing, based upon the classified query, one of: (a) querying one or more knowledge graphs to generate a first set of responses corresponding to the set of natural language queries; or (b) updating, by the KGU-NL Agent, the one or more knowledge graphs to generate a second set of responses corresponding to the set of natural language queries; hierarchically defining, based upon the set of anticipated natural language user queries, the plurality of components and the one or more multi-purpose conversational agents to process the natural language queries; auto-generating, based upon one or more training datasets, a plurality of recommended questions for one or more users to facilitate the processing of natural language queries; updated the one or more knowledge graphs by the Knowledge Graph Update Agent based upon a set of information obtained from one or more users by the Knowledge Graph Engage Agent, and wherein the set of information corresponds to the processing of natural language queries; obtaining the set of information from the one or more users by either a pro-active user engagement or by an analysis of information corresponding to the one or more knowledge graphs by the Knowledge Graph Engage Agent; generating the first set of responses by: (i) mapping one or more entities corresponding to the one or more knowledge graphs with one or more phrases corresponding to the classified query by an inverted index based searching technique; and (ii) traversing, based upon the mapping, the one or more knowledge graphs to generate the first set of responses; and generating the second set of responses by either engaging the user to extract the in-depth information corresponding to the set of natural language queries or by executing a set of commands by an interface.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 2A, 2B, and 2C are a flow diagram illustrating the steps involved in the process of Deep Learning techniques based multi-purpose conversational agents for processing the natural language queries, in accordance with some embodiments of the present disclosure.

FIG. 7 illustrates a self-service console portal facilitating Deep Learning techniques based multi-purpose conversational agents for processing the natural language queries, in accordance with some embodiments of the present disclosure.

DETAILED DESCRIPTION

Figure 1:
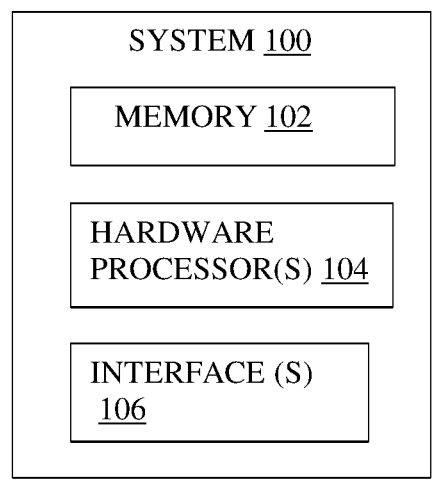
FIG. 1 illustrates a block diagram of a system for Deep Learning techniques based multi-purpose conversational agents for processing natural language queries, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments of the present disclosure provide systems and methods for Deep Learning techniques based multi-purpose conversational agents for processing natural language queries, according to some embodiments of the present disclosure. A natural language processing model may be a machine learning system, or component thereof, used by a computer system to interact with human languages. For example, a natural language processing model may receive a query as input, and may make predictions about the text of the query to help determine what the query is requesting and what information or actions might be relevant responses to the query. Natural language processing is desired because it allows users to speak their own language when formulating their request for information, rather than forcing them to speak in a form a technology may understand.

Most of the Artificial Intelligence based conversational systems do not employ deep learning algorithms and thus unable to process large number of Intents. Further, none of them currently support knowledge graphs or proactive user engagement for knowledge elicitation, as we do. Also the current AI-based conversational systems lack the ability to host multiple different processing and answering agents for virtual assistance via the single digital persona. For identifying intents, most of the systems uses rules which we have avoided by using Convolutional Neural Networks (CNN), Long short term memory (LSTM) based models for intent identification. It may be challenging for an end-to-end model to serve users' queries in multiple different domains (for example, leave, insurance etc. in an organization) and also engage them in a meaningful dialogue to elicit the required information. Without a clear configuration as to what information needs to be elicited in the context of a given intent, carrying out a conversation with user(s) may be challenging.

Hence, there is a need for a technology that provides for seamless interactions between multiple machine learning probabilistic components working in parallel, continuous training and worklist for agents, proactive user engagement for knowledge synthesis, high level intent identification for supporting multiple agents under same digital persona and provides for an ability to create agents without writing any program.

Referring now to the drawings, and more particularly to FIGS. 1 through 9, where similar reference characters denote corresponding features consistently throughout the figures, there are shown preferred embodiments and these embodiments are described in the context of the following exemplary system and/or method.

FIG. 1 illustrates an exemplary block diagram of a system 100 for Deep Learning techniques based multi-purpose conversational agents for processing natural language queries, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory 102. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2A:
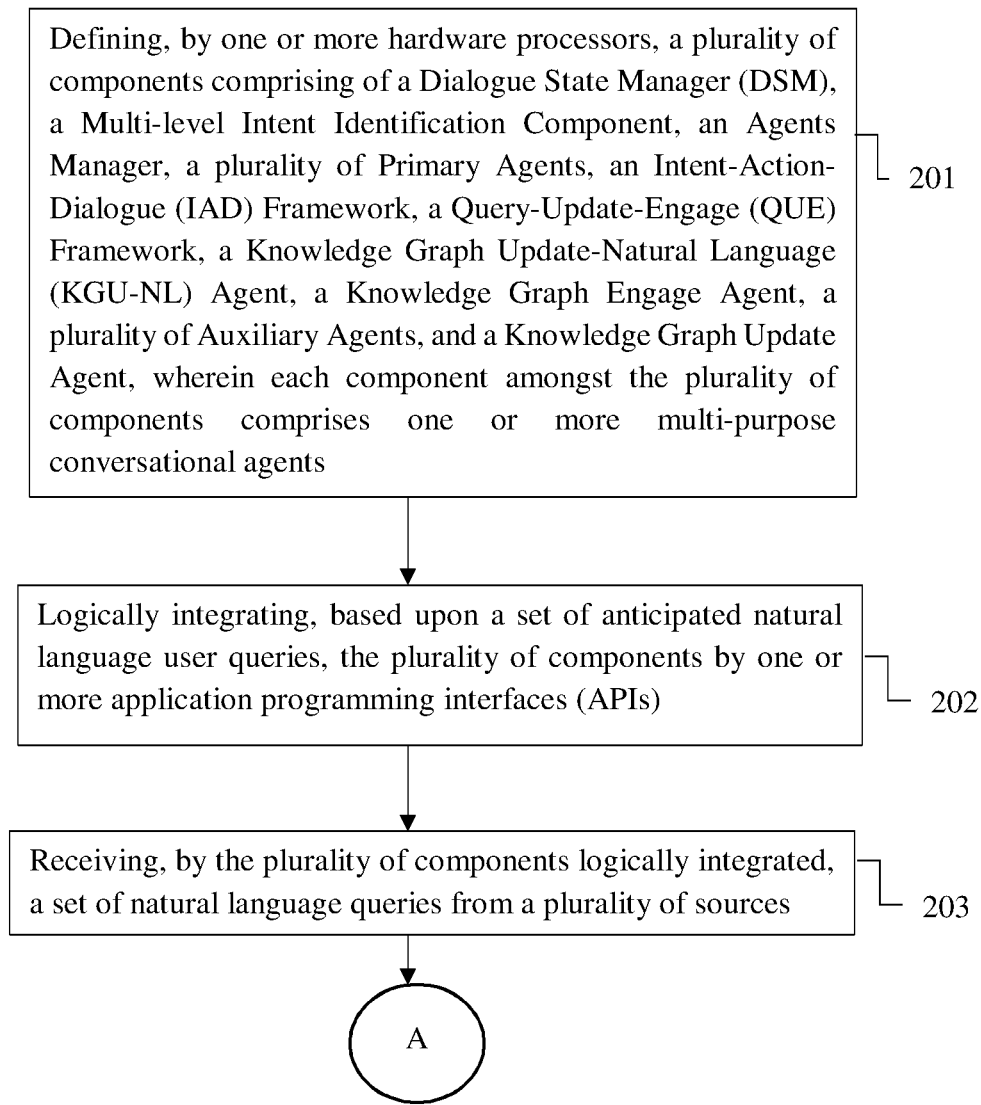
Figure 2B:
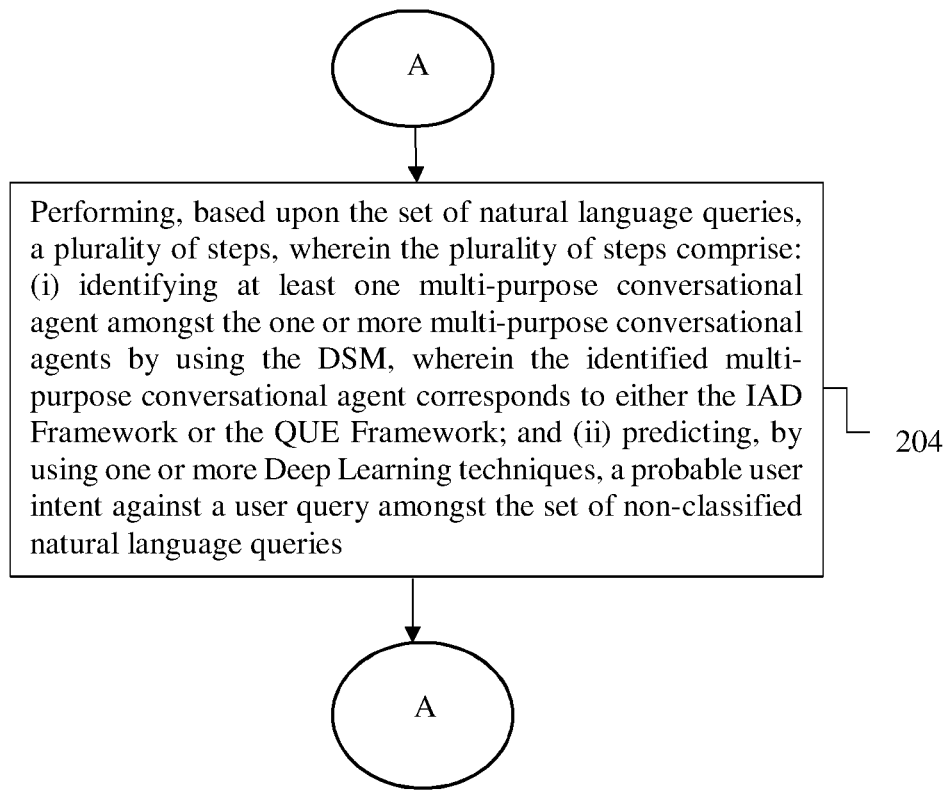

FIG. 2A through 2C, with reference to FIG. 1, illustrates an exemplary flow diagram of a method for Deep Learning techniques based multi purpose conversational agents for processing the natural language queries, in accordance with an embodiment of the present disclosure. In an embodiment the system 100 comprises one or more data storage devices of the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1 and the flow diagram. In the embodiments of the present disclosure, the hardware processors 104 when configured the instructions performs one or more methodologies described herein.

Figure 3:
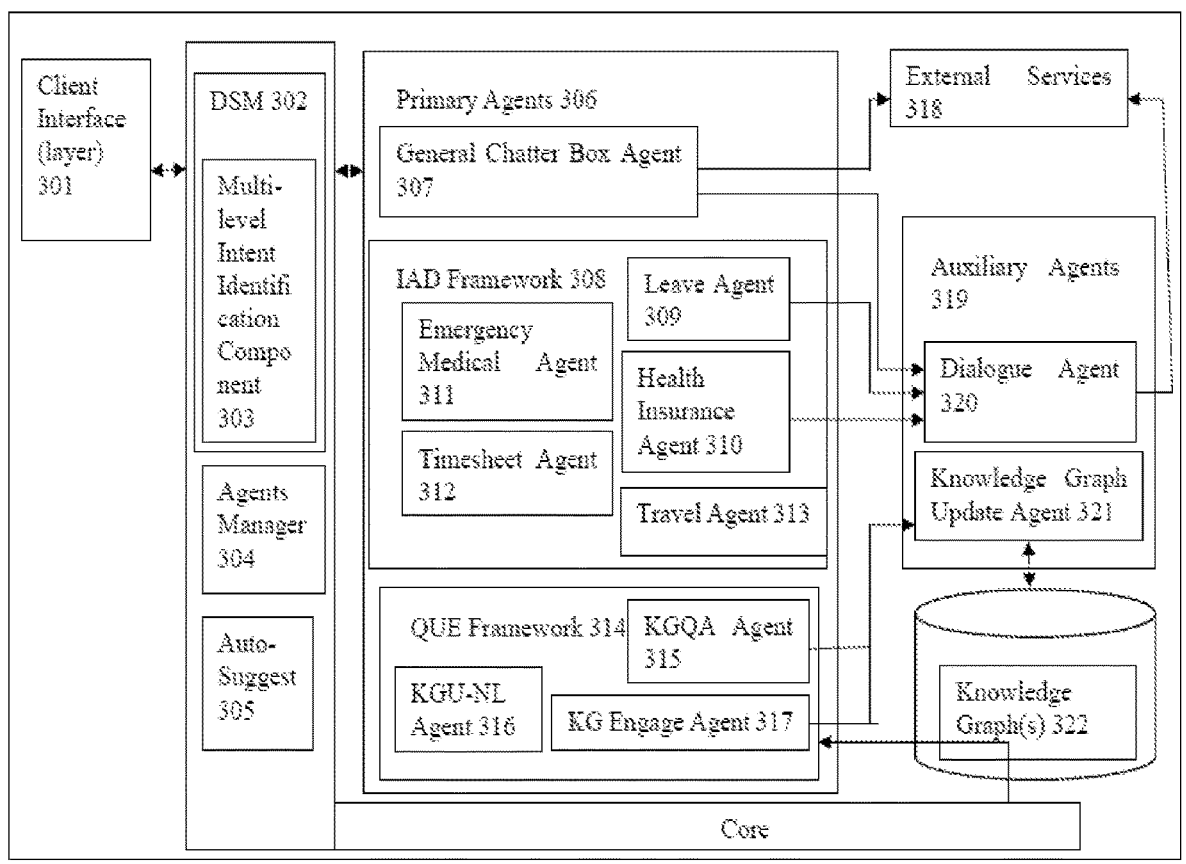
FIG. 3 illustrates a technical architecture depicting the components and flow of a system for Deep Learning techniques based multi-purpose conversational agents for processing the natural language queries, in accordance with some embodiments of the present disclosure.

According to an embodiment of the present disclosure, at step 201, the one or more hardware processors 104 define a plurality of components comprising of a Dialogue State Manager (DSM) 302, a Multi-level Intent Identification Component 303 (as a part of the DSM 302) an Agents Manager 304, a plurality of Primary Agents 306, a plurality of Auxiliary Agents 319 and a Knowledge Graph Optimizing Agent. In an embodiment, each component amongst the plurality of components comprises one or more multi-purpose conversational agents. Referring to FIG. 3, the plurality of components defined may now be considered in detail.

According to an embodiment of the present disclosure, the DSM 302 comprises of one or more Deep Learning techniques based Multi-level Intent Identification Component 303. When any of a multi-purpose conversational agent amongst the plurality of components need to enter a multi-turn dialogue initiated by one or more users, all the multi-purpose conversational agents corresponding to each of the components amongst the plurality of components communicate (via one or more application programming interfaces (APIs)) (not shown in the figure) with the DSM 302 to keep forwarding the multi-turn dialogue initiated by the one or more users to that multi-purpose conversational agent which needs to enter the multi-turn dialogue, until the multi-purpose conversational agent which needs to enter the multi-turn dialogue release the control again to the DSM 302 to decide the flow.

In an embodiment, the DSM 302 maintains a stack, wherein the stack comprises of one or more pointers facilitating interactions between the plurality of Primary Agents 306, the plurality of Auxiliary Agents 319, the Knowledge Graph Optimizing Agent and the other agents shown in FIG. 3. In an example scenario, referring to FIG. 3 again, a Health Insurance Agent 310 may call or interact with a Dialogue Agent 320 for certain intent. The stack of may be persisted in a sessions state as the one or more carries out a conversation spanning multiple agents referred to in FIG. 3.

According to an embodiment of the present disclosure, the Multilevel Intent Identification Component 303 identifies an appropriate multi-purpose conversational agent based upon a plurality of user utterances (or the natural language queries) by a Deep Learning classifier (discussed later). If response(s) generated by the appropriate multi-purpose conversational agent is not appropriate or as per the one or more users expectations, the Multi-level Intent Identification Component 303 communicates the natural language queries to the plurality of Primary Agents 306 or the plurality of Auxiliary Agents 319 and the one or more multi-purpose conversational agents corresponding to the plurality of Primary Agents 306 or the plurality of Auxiliary Agents 319 via the APIs. The one or more multi-purpose conversational agents return control to the DSM 302 with appropriate response(s) or with a status that the query may not be served. The response(s) are evaluated by the DSM 302 and the best response is generated to the one or more users based upon query-answer similarity (discussed later).

According to an embodiment of the present disclosure, the defined plurality of components further comprise an auto-suggestion mechanism 305 for auto-generating, based upon one or more training datasets, a plurality of recommended questions for the one or more users to process the natural language queries. In an embodiment, the plurality of recommended questions may be based upon past usage(s) or queries may be auto-generated to the one or more users. The plurality of recommended questions may comprise different categories of questions may be based upon the one or more training datasets.

In an embodiment, each of the one or more multi-purpose conversational agents maintains the one or more training datasets and if the natural language queries from the one or more users match with the one or more training datasets, the one or more multi-purpose conversational agents do not execute any machine learning model and generate the response(s) based upon the one or more training datasets. This ensures that correct response(s) corresponding to the natural language queries received gets generated via the one or more training datasets. In an example scenario, the plurality of recommended questions that may be auto-generated may comprise a question taken from a similar intent as the one or more users most recent question (for example, belonging to same leave type such as sick leave) in the one or more training datasets of the current agent, question from next intent as available in the one or more training datasets, and a question from the one or more training datasets of a randomly chosen agent.

In an embodiment, the Agents Manager 304 provides for a set of commands to manage training(s) of the plurality of Primary Agents 306, the plurality of Auxiliary Agents 319 and the one or more multi-purpose conversational agents, or to observe usage patterns, for example, to show usage statistics, user logs, disliked/liked queries, etc., as well as for continuous training (discussed below). The set of commands are not subject to the Multi level Intent Identification Component 303, and may be treated differently by the DSM 302.

When the appropriate response(s) corresponding to the natural language queries by the one or more users is not generated, the one or more users may ask for alternative responses for example, a 'x opt' command, which then returns the appropriate response(s) in order of classifier probabilities. Thereafter, a command such as 'x intent-id 4' marks the correct intent. The appropriate response(s) generated based upon the set of commands gets added in the one or more training datasets of respective agent, and as a result, if the same query is raised by the one or more users later, the correct response(s) is generated. The functions, usage and implementation of the one or more multi-purpose conversational agents like a Knowledge Graph Update-Natural Language (KGUNL) Agent 316, a Leave Agent 309 and the Health Insurance Agent 310 etc. have been explained later with example implementations.

A continuous improvement in the performance of machine learning components may require obtaining feedback from the one or more users. The proposed disclosure facilitates for a Feedback Management mechanism (not shown in the figure) to facilitate this. The Feedback Management mechanism comprises one or more mentors for each of the one or more multi-purpose conversational agents. When the one or more users dislike response(s) corresponding to the natural language queries processed, a workflow may be created, wherein the workflow gets cleared by the one or more mentors corresponding to a multi-purpose conversational agent (amongst the one or more multi-purpose conversational agents) which generated the response(s).

In an embodiment, the one or more mentors initially use one or more commands to train the multi-purpose conversational agent (which generated the response(s)) before clearing the workflow. If one or more natural language queries (amongst a set of natural language queries) get communicated to a wrong agent (amongst the one or more multi-purpose conversational agents), the one or more mentors forward the workflow to a set of mentors corresponding to the DSM 302.

Based upon un-attended queries amongst the one or more natural language queries in the workflow of a mentor amongst the set of mentors corresponding to the DSM 302, an appropriate multi-purpose conversational agent pro-actively initiates a dialogue the mentor (that is, with the mentor amongst the set of mentors corresponding to the DSM 302) and seeks guidance on answering the un-attended queries in a best way. The Feedback Management mechanism facilitates periodic training of all the plurality of components and the one or more multi-purpose conversational agents.

Figure 4:
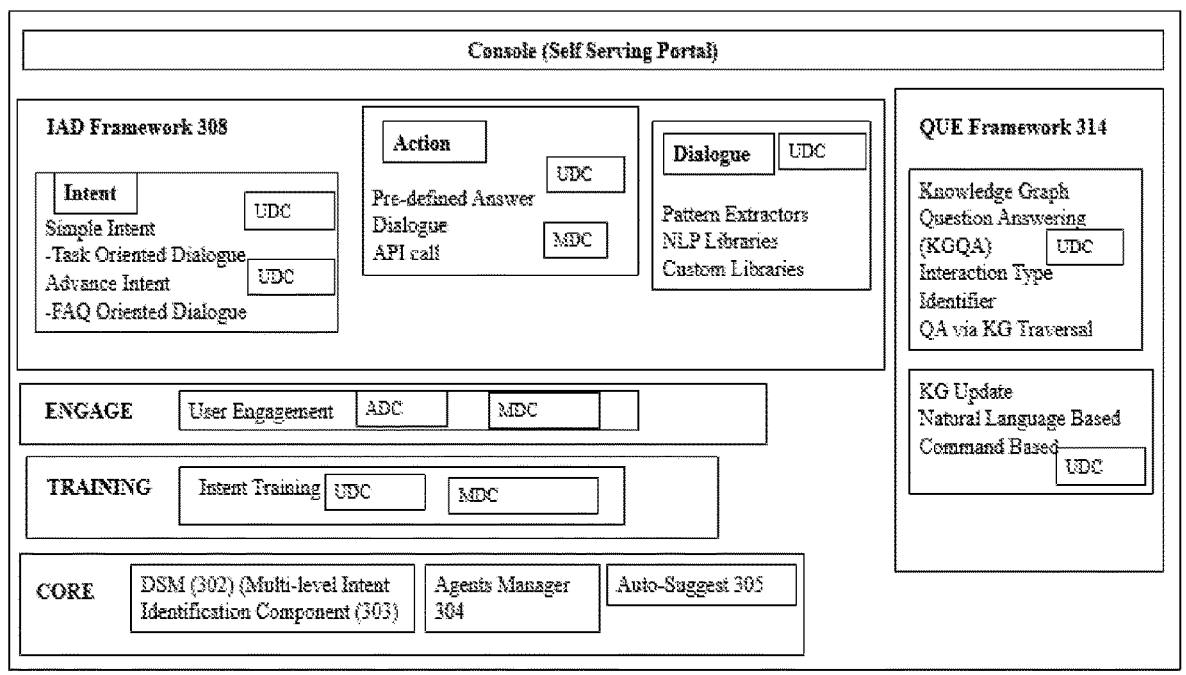
FIG. 4 illustrates a functional architecture of a system for Deep Learning techniques based multi-purpose conversational agents for processing the natural language queries, in accordance with some embodiments of the present disclosure.
Figure 5:
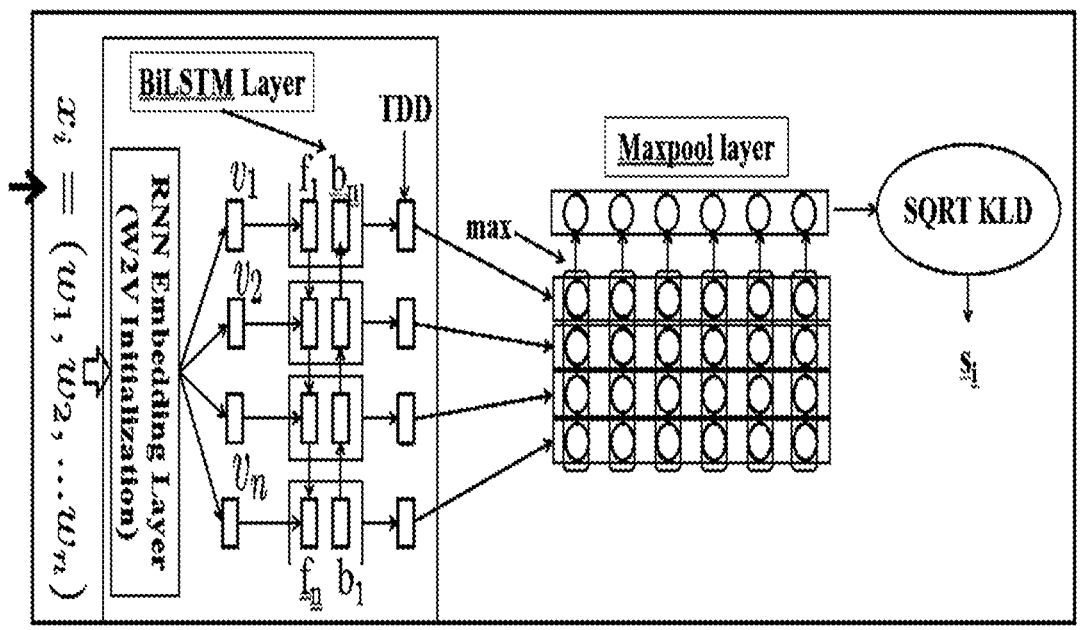
FIG. 5 illustrates a Deep learning architecture based upon a Bidirectional Long Short Term Memory (BiLSTM) network (or the BiLSTM classification), a maxpool layer and a Square root Kullback Leibler Divergence (SQRD-LKD) function, in accordance with some embodiments of the present disclosure.

Referring to FIG. 4, a functional architecture of Deep Learning techniques based multi-purpose conversational agents for processing the natural language queries may be referred. Referring to FIG. 4 again, it may be noted that three types of conversational categories have been marked a) User Driven Conversation (UDC) for situations when he one or more users initiates a conversation, b) Agent Driven Conversation (ADC), when an agent amongst the one or more multi-purpose conversational agents proactively initiates the conversation, and c) Model Driven Conversation (MDC), when a machine learning model initiates the dialogue to update its training data.

According to an embodiment of the present disclosure, at step 202, the one or more hardware processors 104 logically integrate, based upon a set of anticipated natural language user queries, the plurality of components by the one or more APIs. Referring to FIGS. 3 and 4 again, the logical integration of the plurality of components may be referred (via the technical and functional architectures). The set of anticipated natural language user queries may range from a simple query, for example, "how are you doing" to complex queries relating to health or medical related policies, and very complex queries ranging from research questions, which may require generating responses by mapping queries from knowledge databases. Further, the research questions (in the form of any natural language query) may come from multiple sources like a research unit within an organization.

The initial layer comprises of core components, wherein the core components are the DSM 302, the Agents Manager 304 and the Auto-suggest mechanism 305. Although the functions of the plurality of components have been discussed above, it may be referred below again to understand the concept of the logical integration.

In an embodiment, the set of natural language queries are initially received by the DSM 302 and then based upon the intent of each of natural language query amongst (the set of natural language queries), it is then forwarded by the Multi-level Intent Identification Component 303 to the appropriate agent amongst the one or more multi-purpose conversational agents for processing (discussed later in detail later). The Auto-suggest mechanism 305 assists the one or more users in deciding what kind of natural language queries or the plurality of questions may be raised. The Agents Manager 304 provides for the set of commands to manage the plurality of Primary Agents 306, the plurality of Auxiliary Agents 319 and the one or more multi-purpose conversational agents.

Referring to FIG. 3 again, it may be noted that the next layer comprises of the plurality of Primary Agents 306 comprising of a General Chatter Box Agent 307, an Intent-Action-Dialogue (IAD) Framework 308 and a Query Update-Engage (QUE) Framework 314. The General Chatter Box Agent 307 corresponds to the IAD Framework 308 and answers general utterances, for example, "how are you doing", "what do you do etc."? The IAD Framework 308 comprises of the one or more multi-purpose conversational agents for answering the one or more natural language queries from the one or more users. Considering an example scenario, referring to FIG. 3 again, the one or more multi-purpose conversational agents corresponding to the IAD Framework 308 comprise of the Leave Agent 309, the Health Insurance Agent 310, an Emergency Medical Agent 311, a Timesheet Agent 312 and a Travel Agent 313.

In an embodiment, the one or more multi-purpose conversational agents corresponding to the IAD Framework 308 may perform a plurality of functions. Considering an example scenario again, the Health Insurance Agent 310 may answer a natural language query "what is my health premium amount due" while the Leave Agent 309 may answer a natural language query "how many leaves I have pending?". Similarly, the Timesheet Agent 312 may answer timesheet related natural language queries, while the Travel Agent 313 may answer travel related natural language queries. The Emergency Medical Agent 311 may assist the one or more users on medical related emergencies. It may be noted that the embodiments of the present disclosure do not restrict the IAD Framework 308 to the one or more multi-purpose conversational agents discussed above. The IAD Framework 308 may comprise multiple different multi-purpose conversational agents (other than the ones discussed) for performing different kinds of functions.

In an embodiment, the QUE Framework 314 comprises of a Knowledge Graph Question Answering (KGQA) Agent 315 configured to answer natural language queries on research, the Knowledge Graph Natural Language Update (KGU-NL) Agent 316 configured for knowledge synthesis and a Knowledge Graph Engage Agent 317 to pro-actively engage the one or more users for obtaining further information corresponding to the natural language queries from the one or more users. The Knowledge Graph Engage Agent 317 engages the one or more users for dialogue(s) with the one or more users or researchers and other relevant stakeholders. As mentioned above, the research questions (in the form of natural language queries) may come from multiple sources like a research unit within an organization.

In an embodiment, referring to FIG. 3 again, it may be noted that the plurality of Auxiliary Agents 319 comprise of the Dialogue Agent 320 for managing all dialogues, a Knowledge Graph Update Agent 321 updates one or more knowledge graphs 322 and communicates with a Knowledge Graph Database (now shown in the figure). The Knowledge Graph Database maintains all relevant information corresponding to the one or more knowledge graphs 322.

In an embodiment, one or more External Services 318 may comprise of any database or an architecture or any other hardware/software component from external source(s) that may communicate with the plurality of components via the one or more APIs. Thus, the plurality of components and the one or more multi-purpose conversational agents have been logically integrated and defined in a hierarchy based upon the set of anticipated natural language user queries, their usage(s), functions and other necessary parameters.

The technical integration of the plurality of components may now be considered in detail. A client interface layer 301 may be implemented using a front controller servlet in JAVA™ that receives incoming Representational State Transfer (REST) requests, performs authenticity of request and forwards the request to the DSM 302. The plurality of components have been implemented in python using various machine learning and deep-learning libraries such as Numpy, Scipy, Keras, Tensorflow/Theano etc. The plurality of components have been deployed as RESTful services and JavaScript™ Object Notation (JSON) format is used for messages exchange. User session state is stored in a no-sql database Redis. To facilitate a system initiated dialogue, a question queue is maintained for every user amongst the one or more users in the Redis database itself, and the Knowledge Graph Engage Agent 317 picks up these questions. The logical integration facilitates tracking of interaction(s) of the one or more users with a digital persona and maintain interaction logs. The interaction logs are used to generate usage statistics of a computing system. To ensure that the computing system (that's is, on which the proposed methodology has been implemented and tested) remains up all the time, auto-startup mechanism has been established for all individual restful services.

It may be noted that the embodiments of the present disclosure do not restrict the logical integration of the plurality of components to as referred to in FIGS. 3 and 4 only. The embodiments of the present disclosure provide for defining and logical integration of one or more new components based upon the natural language queries and/or based upon the set of anticipated natural language queries or based upon any other technical/non-technical requirements(s).

According to an embodiment of the present disclosure, at step 203, the one or more hardware processors 104 receive, by implementing the plurality of components logically integrated, the set of natural language queries from a plurality of sources. The set of natural language queries may be initially received by the DSM 302 (as discussed above) and then the Multi-level Intent Identification Component 303 identifies the appropriate multi-purpose conversational agent amongst the one or more multi-purpose conversational agents to process the set of natural language queries received (discussed in detail in step 204(i) below).

In general, the set of natural language queries may comprise of one or more queries expressed in English or in any other spoken language (or any natural language) in a normal manner. For example, "what is my health premium due" or "what is my leave balance". A characteristic of natural language text is normally the use of words (references) that refer to other words or to concepts that appear in or are implied by other parts of the text (antecedents). The set of natural language queries may be received from the plurality of sources for processing, for example, from the one or more users. Further, using modern computing systems and processors, information from various sources can be almost instantaneously obtained and may be raised as a query in a natural language for further processing.

According to an embodiment of the present disclosure, at step 204(i), the one or more hardware processors 104 identify, based upon the set of natural language queries received, at least one multi-purpose conversational agent amongst the one or more multi-purpose conversational agents by using the DSM 302, wherein the identified multi-purpose conversational agent corresponds to either of the IAD Framework 308 or the QUE Framework 314. At step 204(ii), the one or more hardware processors 104 predict, by using one or more Deep Learning techniques, a probable user intent against a user query amongst the set of non-classified natural language queries. As compared to the traditional systems and methods, which use an interactive voice response to answering the natural language queries, the proposed disclosure provides for a High Level Intent Identification technique for identifying a multi-purpose conversational agent. The steps 204(i) and (ii) may be explained in detail in parallel via an Intent Identification technique discussed below.

Intent Identification: In an embodiment, the IAD Framework 308 facilitates two types of models for predicting the probable user intent, a Simple Intent Model and an Advance Intent Model. The models take the one or more training datasets as an input. The one or more training datasets comprise a set of semantically similar sets of queries and a set of answers corresponding to the semantically similar sets of queries. In an embodiment, the models take a training data represented as $D=\{s1,2 \ldots si\}$, which is a set of intent-IDs si. As mentioned above, each intent-IDs si comprises the set of semantically similar queries represented as $Xi=\{x1\ i, 2\ i, \ldots, xm\ i\}$ and the corresponding set of answers represented as $Y\ i=\{y1\ i, y2\ i, \ldots, ymi\}$, that is, $si=(Xi, Y\ i)$. The goal of the models is to identify the intent IDF, that is, si for every user query x. In an example implementation, referring to Table 1, below an example of the one or more training datasets may be referred.

Simple Intent Model: The Simple Intent Model is implemented when the data is limited in volume and has a low inter-intent-ID similarity, that is when the textual similarities between the one or more natural language queries (amongst the set of natural language queries) belonging to any two different intentIDs is low. In an embodiment, the volume refers to the number of intentIDs and the number of queries in an intent-ID. A model based upon the textual similarities, that is, the Simple Intent Model is suitable under such circumstances. A SequencerMatcher technique may be implemented to find one or more similarities between a pair if queries which considers each query as a sequence of characters as shown in equation below. The SequencerMatcher technique facilitates robustness against spelling mistake while implementing the Simple Intent Model.

In an embodiment, to answer a user query x, the similarity between the user query x and every query present in D may be computed and the intent-ID with the most similar query is identified as $si=\mathrm{argmax}_{si \in D} sim(x, xji)$ where:

$$(x, xji) = 2*(M/T) \text{ equation}$$

wherein M is the number of matches and T is the total number of characters in the x and xji. Once the intent si is identified, a random response from the corresponding set of responses Yi may be generated.

TABLE 1

| Intent ID | Training Datasets | Action |
| --- | --- | --- |
| 1 | Can I apply for Sick Leave in advance? | Pre-defined answer Y i |
| 1 | Is it possible to apply sick leave in advance? | |
| 1 | I have doctor's appointment tomorrow, can I apply the sick leave in advance? | |

TABLE 1-continued

| Intent ID | Training Datasets | Action |
| --- | --- | --- |
| 2 | Give a list of holidays this year | Call-API for Checking Holiday List |
| 2 | On which all days this do we have a holiday? | |

In an example implementation, suppose a user query is "Can I apply for Sick Leave in advance?" and the semantically similar sets of queries comprise "Is it possible to apply sick leave in advance?" or "I have doctor's appointment tomorrow, can I apply the sick leave in advance?" The probable user intent by implementing the Simple Intent Model may be predicted as "sick leaves" or "holiday(s)" and the set of answers corresponding to the semantically similar sets of queries may be generated as "Please apply advanced sick leave" or "Please apply sick leave(s) in case of doctor's appointment".

Advance Intent Model The proposed disclosure provides for the High Level Intent Identification technique upon determining the number of intents to be high and many words are common between the one or more natural language queries of two different IDs, for example, "if I take a leave on coming Friday and Monday, will the week-end also get counted?"

The Advance Intent Model is based upon a Bidirectional Long Short Term Memory (BiLSTM), which is a variant of a recurrent neural network. In an embodiment, every intent-ID si is assumed to be a class in multi-class classification problem, that is:

$$s = \mathrm{argmax} P(si/x)$$

$$si \in D$$

According to an embodiment of the present disclosure, every natural language query may initially be represented as a sequence of word embedding. The sequence of word embedding may be obtained using a word2vec technique that represents every word in the text as a vector for facilitating processing by algorithm(s). A sequence of word vectors may then be fed into a layer of the BiLSTM to obtain representation of the natural language query represented as the sequence of word embedding.

At every step (that is, the word corresponding to the user utterance) a word embedding may be fed as an input into Long Short Term Memory (LSTM). Due to bidirectional architecture, the sequence is given as input in forward and reverse order, which results in context retention from both directions at every word. As a result, T hidden states may be obtained from a layer of the BiLSTM, which is further fed as an input to the maxpool layer, wherein the maxpool layer acts as a supervisory layer over the hidden states.

The maxpool layer extracts semantically significant features from the hidden states at every dimension. The output of the maxpool layer is retained as sentence embedding. Finally, the sentence embedding may be classified using a softmax classifier to obtain the corresponding intent-IDs. In an example implementation, referring to FIG. 5, a Deep learning architecture based upon the BiLSTM, the maxpool and Square root Kullback Leibler Divergence (SQRD LKD) may be referred. Although, the Advance Intent Model can determine intents for a limited domain of queries, that is, only for data on which they are trained. However, the Advance Intent Model may also support other domain of queries, that is, un-trained queries as well.

In an example implementation of the step 204(i), suppose the one or more natural language queries amongst the set of natural language queries from the one or more users comprise "if I take a leave on coming Friday and Monday, will the week-end also get counted?" and "will the leave without pay days get counted, if I take sick leave in between?" By implementing the High Level Intent Identification technique, the multi-purpose conversational agent maybe identified as the Leave Agent 309, wherein the Leave Agent 309 corresponds to the IAD Framework 308.

Similarly, suppose the one or more natural language queries comprise "Show me deep learning papers in cloud robotics". By implementing the High Level Intent Identification technique, the multi-purpose conversation alagent may be identified as the KGQA Agent 315, wherein the KGQA Agent 315 corresponds to the QUE Framework 314.

In an example implementation of the step 204(ii), suppose the one or more natural language queries amongst the set of natural language queries from the one or more users comprise "what would be my annual health insurance premium?" By implementing the Advance Intent Model, the probable user intents that may be predicted comprise of a category of semantically similar questions, for example, "what would be my health insurance premium amount" and "what would be my insurance premium".

According to an embodiment of the present disclosure, at step 205, the one or more hardware processors 104 perform, based upon the predicted probable user intent and the identified multi-purpose conversational agent, either one of the steps 205(i) or 205(ii).

In an embodiment, suppose for the one or more natural language queries "if I take a leave on coming Friday and Monday, will the week-end also get counted?" the predicted probable user intents comprise of the category of the semantically similar questions, for example, "is weekend also counted if I take a leave on Friday and Monday" and "If I plan to take a leave on Friday and Monday, will the weekend also gets included?". The multi-purpose conversational agent is identified as the Leave Agent 309, wherein the Leave Agent 309 corresponds to the IAD Framework 308. The one or more hardware processors 104 may either select one or more pre-defined set of responses amongst a plurality of pre-defined set of responses or engage a user for extracting in-depth information or call external APIs for communicating the in-depth information to the one or more external services 318 upon determining the identified multi-purpose conversational agent to be corresponding to the IAD Framework 308, wherein the pre-defined set of responses and the in-depth information correspond to the set of natural language queries.

In an embodiment, suppose the one or more natural language queries comprise "can I apply sick leave in advance", the one or more hardware processors 104 may select the pre-defined set of responses as "Yes" and/or "Sick leaves can be applied in advance". However, if the one or more users further asks a query "if I take a leave on coming Friday and Monday, will the weekend also get counted?" and based upon the predicted probable user intents by the either of Intent Identification models described above, the further queries are identified as "is weekend also counted if I take a leave on Friday and Monday" and "If I planto take a leave on Friday and Monday, will the weekend also gets included?". Such a situation may require further in-depth information.

In an embodiment, a dialogue initiation may be required when an intent needs additional information to select an appropriate response. Suppose the one or more natural language queries comprise "Casual leave for two days". In such a scenario, leave type, leave start date and end date may be required. However, the one or more users may further ask question(s) pertaining to the one or more natural language queries different from the above context. In such a scenario, the one or more hardware processors 104 forward the control to the DSM 302, and the DSM 302 takes a decision to forward the one or more natural language queries to an appropriate agent (amongst the one or more multi-purpose conversational agents) and let the one or more users continue the dialogue or conversation.

Figure 6:
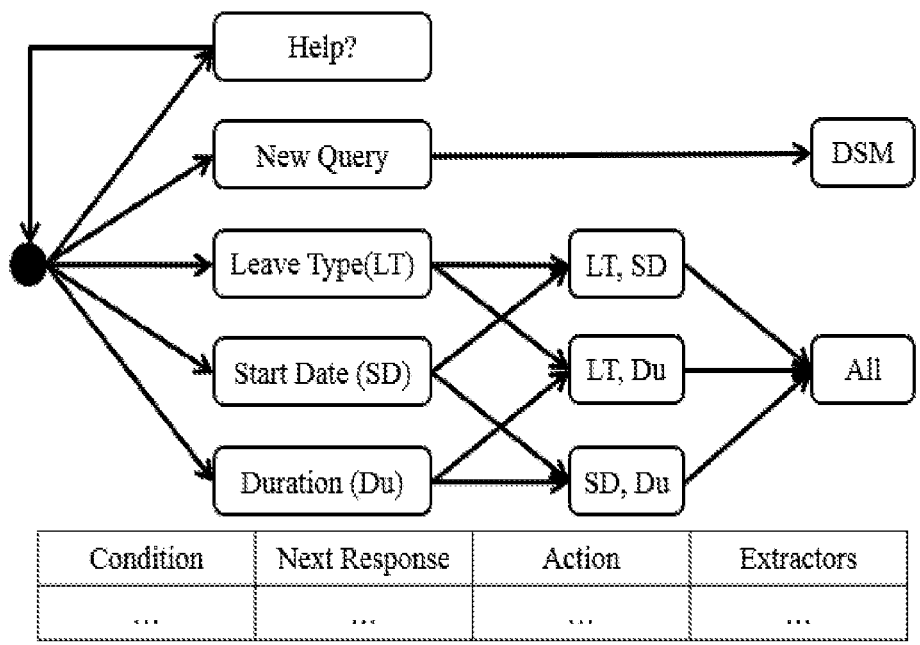
FIG. 6 illustrates an example diagram of a Finite State Automation (FSA) for a dialogue, in accordance with some embodiments of the present disclosure.

Referring to FIG. 6, there may be a Finite State Automation (FSA). Depending upon the current state of the dialogue, the one or more users may be asked further information until all relevant information has been obtained to facilitate generating response(s) by either of the one or more multi-purpose conversational agents. If there is need to obtain information to response to the one or more natural language queries from the one or more external services 318, the external APIs may be called for communicating the in-depth information to the one or more external services 318.

Referring to FIG. 7, it may be noted that the proposed disclosure provides for a self-service console portal in a spread-sheet format for specifying the FSA for any dialogue required in the IAD Framework 308. In a 'Condition' column (not shown in the figure), a qualifying condition for a state of the FSA may be specified. Similarly, in the 'Next Response' (not shown in the figure), the next question to be asked to the one or more users may be specified. Similarly, in an 'Extractors Column', the appropriate information extractor APIs, that is, lEAPIs may be specified. The IE-APIs are used to extract appropriate information from the responses obtained from one or more users such as Leave Type='casual leave' from 'I want to apply for casual leave'. In an embodiment, all the IE-APIs to facilitate extracting two extra types of information 'Help', and 'New Query'. The IAD framework 308 provides a library of information extractors such as Date Extractor, Number Extractor, Pattern Extractor (based on specified list of entity names), etc. Custom extractors can also be written for other requirements where the above do not suffice.

According to an embodiment of the present disclosure, if the one or more natural language queries comprise "Show me deep learning papers in cloud robotics", "How many people are working in company X on Deep Genomics", and "Our paper has been accepted in KDD". The predicted probable user intent is as follows: "Show me deep learning papers in cloud robotics" corresponds to a factoid question, "How many people are working in company X on Deep Genomics" corresponds to an aggregate question and "Our paper has been accepted in KDD" corresponds to updating the one or more knowledge graphs 322. Further, the identified multi-purpose conversational agent corresponds to the QUE Framework 314, the one or more hardware processors 104 classify the query to identify one or more categories of conversations by implementing a recurrent neural network technique. As discussed above, the set of natural language queries reach the QUE Framework 314 via the Multi-Level Intent Identification Component 303 of the DSM 302.

Figure 8:
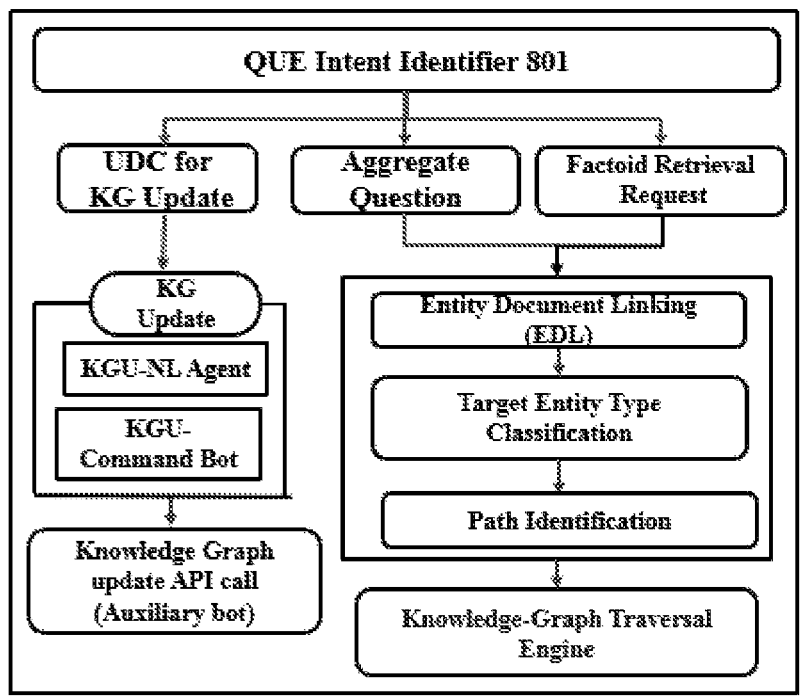
FIG. 8 illustrates a technical architecture of a QUE Intent Identifier implemented inter-alia, for knowledge synthesis and the BiLSTM classification, in accordance with some embodiments of the present disclosure.
Figure 9:
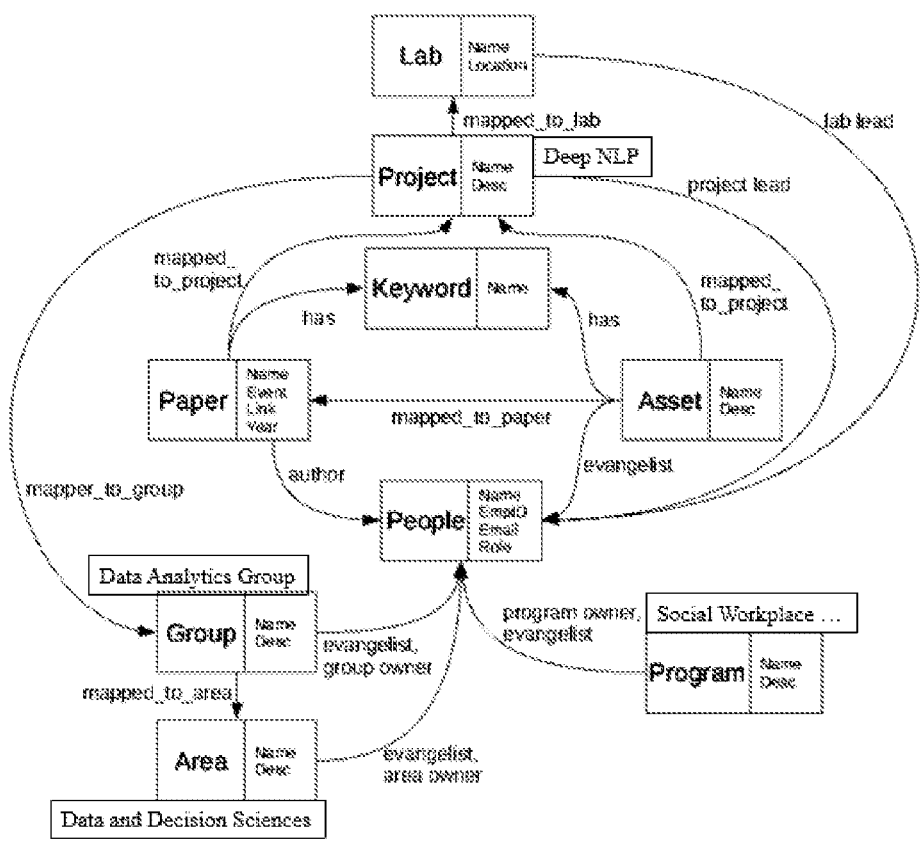
FIG. 9 illustrates a visual representation of one or more knowledge graphs integrated with the technical architecture, in accordance with some embodiments of the present disclosure.

The QUE framework 314 classifies the query based upon utterance(s), that is, if it is the User Driven Conversation (UDC) to update the one or more knowledge graphs 322 or it is an aggregate question, for example, "How many people are working in company X on Deep Genomics" or if it is a factoid retrieval request or a factoid question from the one or more knowledge graphs 322, for example, "Does an organization X research have any reusable asset of advanced sensor data analytics" or "Show me deep learning papers in cloud robotics". In an embodiment, the classification may be performed by implementing the BiLSTM classification discussed above by implementing a Query-Update-Engage (QUE) Intent Identifier 801. Referring to FIG. 8, architecture of the QUE Intent Identifier 801 may be referred.

As discussed above, the one or more hardware processors 104 classify the query to identify the one or more categories of conversations by implementing the recurrent neural network technique upon determining the identified multi-purpose conversational agent to be corresponding to the QUE Framework 314. Based upon the classified query, the one more hardware processors 104 perform either of the steps 205(iii)(a) or 205(iii)(b). This may now be considered in detail.

Based upon the classified query, the one or more hardware processors 104 query the one or more knowledge graphs 322 to generate a first set of responses corresponding to the set of natural language queries. The step of generating the first set of responses comprises mapping one or more entities corresponding to the one or more knowledge graphs 322 with one or more phrases corresponding to the classified set of natural language queries by an inverted index based searching technique and traversing, based upon the mapping, the one or more knowledge graphs 322 to generate the first set of responses. The process of querying and generation of the first set of responses may now be discussed in detail.

In an embodiment, to answer the factoid question, the one or more hardware processors 104 initially map the one or more entities (for example, cloud robotics in the natural language query "show me deep learning papers in cloud robotics") corresponding to the one or more knowledge graphs 322 with the one or more phrases corresponding to the classified set of natural language query by implementing the KGQA Agent 315. Considering an example scenario, the one or more phrases corresponding to the classified set of natural language queries "Show me deep learning papers in cloud robotics" and "How many people are working in company X on Deep Genomics" may be "cloud robotics" and "deep genomics" respectively. This is performed by implementing the inverted index based searching technique.

By using the inverted index based searching technique, one or more nodes corresponding to the one or more knowledge graphs 322 are identified and become the starting point of traversal of the one or more knowledge graphs 322. The KGQA Agent 315 may then execute a Deep Learning based classification model to determine what is a target entity type corresponding to the classified natural language query. Considering an example scenario, for the classified natural language queries "Does an organization X research have any reusable asset of advanced sensor data analytics" and "Show me deep learning papers in cloud robotics" the target entity type may be determined as "reusable asset" and "research publications" respectively. This is performed by training the Deep Learning based classification model to classify every query in a number of classes corresponding to the number of target entity types in schema(s) in the Knowledge Graph Database. In an example implementation, referring to FIG. 9, the one or more knowledge graphs 322 comprising sample data as "Data Analytics Group", "Social Workplace" and "Deep NLP" etc. and integrated with the technical architecture (referred to in FIG. 3) may be referred.

According to an embodiment of the present disclosure, in case the one or more users do not mention about the kind of the factoid question that needs to be retrieved from the one or more knowledge graphs 322 (for example, "what we are doing in the area of energy management?"). In such a case one more class named as "no-target" in the target entity type classifier may be added. The target entity type then becomes the end point of knowledge graph traversal. In case there are multiple different paths in the one or more knowledge graphs 322 between the start nodes and nodes of target entity types, the right path may be identified using another Deep Learning based classification model, wherein at least one relationship type that must be present in the one or more knowledge graphs 322 is classified (not discussed via the proposed disclosure). Once the path is identified the corresponding answer may be retrieved by traversing the path.

According to an embodiment of the present disclosure, in case of the aggregate question, the same technique used in the case of the factoid question may be implemented, however, instead of displaying the final list of factoids, the factoids may be aggregated before the display. In an embodiment, a meta-schema may be created for the schema(s), wherein the meta-schema may comprise of two types of entities, a Tangible entity (for example, research papers, researchers, reusable assets, research projects etc.) and an In-Tangible entity (for example, technology keyword, business keyword etc.). In an embodiment, when no target is given, the KGQA Agent 315 may return a count of all Tangible entity types related to the start nodes given in the natural language query.

In an example implementation of the step 205(iii)(a), the first set of responses may be generated as "There are n1 researchers, n1 reusable assets, n3 publications, n4 research projects on energy management".

According to an embodiment of the present disclosure, at step 205(iii)(b), upon determining the identified multi-purpose conversational agent to be corresponding to the QUE Framework 314, the one or more hardware processors 104 update, based upon the classified query, the one or more knowledge graphs 322 query by implementing the KGU-NL Agent 316 to generate a second set of responses corresponding to the set of natural language queries. The one or more knowledge graphs 322 are updated by the Knowledge Graph Update Agent 321 based upon a set of information obtained from the one or more users by the Knowledge Graph Engage Agent 317, and wherein the set of information corresponds to the processing of natural language queries. Further, the set of information is obtained from the one or more users by either a proactive user engagement or by an analysis of information corresponding to the one or more knowledge graphs 322 by the Knowledge Graph Engage Agent 317.

In an embodiment, for updating the one or more knowledge graphs 322, the plurality of Auxiliary Agents 319 expose the one or more APIs. The KGU-NL Agent 316 interacts with the plurality of Auxiliary bots via the IAD Framework 308 (as discussed above). The QUE Intent Identifier 801 communicates the user utterance(s) (for example, "Our paper has been accepted in KDD") to the KGU-NL Agent 316. Upon receiving the user utterance(s), the KGU-NL Agent 316 initiates a dialogue with the one or more users to obtain more information, for example "what is the title of the paper" and "in which project did you write this paper". Thus, the in-depth information corresponding to the set of natural language queries may be extracted by the KGU-NL Agent 316.

In an embodiment, a command based interface Knowledge Graph Update-Command executes the set of commands, for example, "x pik KNADIA", which then displays a list of literals associated with KNADIA (a reusable asset). Similarly, the one or more users may execute the set of commands, for example, 'x mod 3 platform for building conversational agents' to update the one or more knowledge graphs 322.

In an example implementation of the step 205(iii)(b), the second set of responses may be generated as "Research Paper X published in the project XYZ updated with robotics application".

According to an embodiment of the present disclosure, some of the technical advantages of the proposed disclosure may be considered in detail. As compared to the traditional systems and methods, which use an interactive voice response to answering the natural language queries, the proposed disclosure provides for a High Level Intent Identification technique for identifying a multipurpose conversational agent (discussed above). Further, the proposed disclosure provides for maintaining consistency, accuracy and authenticity of the set of information/data in the one or more knowledge graphs 322 by using the Knowledge Graph Engage Agent 317. Upon updating the one or more knowledge graphs 322, the data loaded into the one or more knowledge graphs 322 may comprise of inconsistencies or some relevant information may be missing, for example, information about a paper may be available without a suitable association to a project in an organization. The proposed disclosure facilitates obtaining a list of missing information in the one or more knowledge graphs 322 against a schema.

In an embodiment, based upon the list of missing information, the one or more hardware processors 104 generate one or more questions in natural language from a set of templates in accordance with an entity and the corresponding missing properties.

Further, the information/data in the one or more knowledge graphs 322 needs to be authentic and must be updated by authorized users only. For example, a question about a project must be answered by a project lead only. The target entity, that is, the target username may be difficult to be determined if target user is missing in the one or more knowledge graphs 322 or if there is no project lead. In such a case some other authorized user(s) must answer that question. The proposed disclosure facilitates annotation of every entity and property in the schema(s) of the one or more knowledge graphs 322.

In an embodiment, upon obtaining a list of questions and target user(s) to answer them, the Knowledge Graph Engage Agent 317 engages the one or more users and asks questions(s) at an appropriate time during the conversation. For example, the one or more user may be asked "I'm aware of your recent paper in KDD, for which project was this work done". Thus, the conversation is a real time conversation since the one or more users may anytime ignore the question(s) and ask another question, for example, "is someone working in deep learning in an organization X?" The question asked by the one or more users gets answered first. The proposed disclosure also facilitates making a guess about who may answer the set of natural language queries by using the word2vec technique, in case no information is available in the one or more knowledge graphs 322. Once the guess if made, the one or more knowledge graphs 322 may be updated and the suitable answer(s) from the one or more knowledge graphs 322 based upon the update may be communicated to the one or more users. Thus, knowledge synthesis is achieved.

The proposed methodology provides for a multi-tenant architecture, that is, same instances of the architecture (provided in FIG. 3) may be used for multiple different digital persona in parallel, referred to as tenants. Further, all the multi-purpose conversational agents verify tenant-ids upon receiving the natural language queries and then upload appropriate machine learning/deep learning models to process the natural language queries. Memory cache may also be cleared in round robin manner thereby retaining the k most recently used models for efficiency. The proposed disclosure also facilitates creating new multi-purpose conversational agents based upon the one or more training datasets.

In an embodiment, the memory 102 can be configured to store any data that is associated with Deep Learning techniques based multi-purpose conversational agents for processing natural language queries. In an embodiment, the information pertaining to the plurality of components defined and logically integrated, the set of natural language queries received, the identified multipurpose conversational agent, the predicted probable user intent, the classification of query, and the first set of responses generated and the second set of responses generated etc. is stored in the memory 102. Further, all information (inputs, outputs and so on) pertaining to Deep Learning techniques based multi-purpose conversational agents for processing natural language queries may also be stored in the database, as history data, for reference purpose.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of Deep Learning techniques based multi-purpose conversational agents for processing natural language queries, the method being implemented by one or more processors and comprising:
    defining, by the one or more processors, a plurality of components comprising a Dialogue State Manager (DSM), a Multi-level Intent Identification Component, an Agents Manager, a plurality of Primary Agents, an Intent-Action-Dialogue (IAD) Framework, a Query-Update-Engage (QUE) Framework, a Knowledge Graph Update-Natural Language (KGU-NL) Agent, a Knowledge Graph Engage Agent, a plurality of Auxiliary Agents, and a Knowledge Graph Update Agent, wherein each component amongst the plurality of components comprises one or more multi-purpose conversational agents;
    logically integrating, based upon a set of anticipated natural language user queries, the plurality of components by one or more application programming interfaces (APIs);
    receiving, by the plurality of components logically integrated, a set of natural language queries from a plurality of sources;
    performing, based upon the set of natural language queries, a plurality of steps, wherein the plurality of steps comprise:
        (i) identifying at least one multi-purpose conversational agent amongst the one or more multi-purpose conversational agents by using the DSM, wherein the identified multi-purpose conversational agent corresponds to either the IAD Framework or the QUE Framework; and
        (ii) predicting, by using one or more Deep Learning techniques, a probable user intent against a user query amongst the set of non-classified natural language queries;
    performing, based upon the predicted user intent and the identified multi-purpose conversational agent, steps of:
        (i) selecting one or more pre-defined set of responses amongst a plurality of pre-defined set of responses or engaging a user for extracting in-depth information or calling external APIs for communicating the in-depth information to one or more external services upon determining the identified multi-purpose conversational agent to be corresponding to the IAD Framework, wherein the one or more pre-defined set of responses and the in-depth information correspond to the set of natural language queries;
        (ii) classifying a query amongst the set of natural language queries to identify one or more categories of conversations by implementing a recurrent neural network technique upon determining the identified multi-purpose conversational agent to be corresponding to the QUE Framework; and
        (iii) performing, based upon the classified query, steps of:
            (a) querying one or more knowledge graphs to generate a first set of responses corresponding to the set of natural language queries; and
            (b) updating, by the KGU-NL Agent, the one or more knowledge graphs to generate a second set of responses corresponding to the set of natural language queries,
    wherein the one or more knowledge graphs are updated by the Knowledge Graph Update Agent based upon a set of information obtained from one or more users by the Knowledge Graph Engage Agent, and wherein the set of information corresponds to the processing of natural language queries.

2. The method of claim 1, wherein the logical integration comprises hierarchically defining, based upon the set of anticipated natural language user queries, the plurality of components and the one or more multi-purpose conversational agents to process the natural language queries.

3. The method of claim 2, wherein the defined plurality of components further comprise an auto-suggestion mechanism for auto-generating, based upon one or more training datasets, a plurality of recommended questions for one or more users to facilitate the processing of natural language queries.

4. The method of claim 3, wherein the one or more training datasets comprise a set of semantically similar sets of queries and a set of answers corresponding to the semantically similar sets of queries.

5. The method of claim 1, wherein the set of information is obtained from the one or more users by either a pro-active user engagement or by an analysis of information corresponding to the one or more knowledge graphs by the Knowledge Graph Engage Agent.

6. The method of claim 1, wherein generating the first set of responses comprises:
   (i) mapping one or more entities corresponding to the one or more knowledge graphs with one or more phrases corresponding to the classified query by an inverted index based searching technique; and
   (ii) traversing, based upon the mapping, the one or more knowledge graphs to generate the first set of responses.

7. The method of claim 1, wherein the second set of responses are generated by either engaging the user to extract the in-depth information corresponding to the set of natural language queries or by executing a set of commands by an interface.

8. A system for Deep Learning techniques based multi-purpose conversational agents for processing natural language queries, the system comprising:
   a memory storing instructions;
   one or more communication interfaces; and
   one or more processors coupled to the memory via the one or more communication interfaces, wherein the one or more processors are configured by the instructions to:
   define a plurality of components comprising a Dialogue State Manager (DSM), a Multi-level Intent Identification Component, an Agents Manager, a plurality of Primary Agents, an Intent-Action-Dialogue (IAD) Framework, a Query-UpdateEngage (QUE) Framework, a Knowledge Graph Update-Natural Language (KGU-NL) Agent, a Knowledge Graph Engage Agent, a plurality of Auxiliary Agents, and a Knowledge Graph Update Agent, wherein each component amongst the plurality of components comprises one or more multi-purpose conversational agents;
   logically integrate, based upon a set of anticipated natural language user queries, the plurality of components by one or more application programming interfaces (APIs);
   receive, by the plurality of components logically integrated, a set of natural language queries from a plurality of sources;
   perform, based upon the set of natural language queries, a plurality of steps, wherein the plurality of steps comprise:
   (i) identify at least one multi-purpose conversational agent amongst the one or more multi-purpose conversational agents by using the DSM, wherein the identified multipurpose conversational agent corresponds to either the IAD Framework or the QUE Framework; and
   (ii) predict, by using one or more Deep Learning techniques, a probable user intent against a user query amongst the set of non-classified natural language queries;
   perform, based upon the predicted user intent and the identified multi-purpose conversational agent, steps of:
   (i) select one or more pre-defined set of responses amongst a plurality of pre-defined set of responses or engaging a user for extracting in-depth information or calling external APIs for communicating the in-depth information to one or more external services upon determining the identified multi-purpose conversational agent to be corresponding to the IAD Framework, wherein the one or more pre-defined set of responses and the in-depth information correspond to the set of natural language queries;
   (ii) classify a query amongst the set of natural language queries to identify one or more categories of conversations by implementing a recurrent neural network technique upon determining the identified multi-purpose conversational agent to be corresponding to the QUE Framework; and
   (iii) perform, based upon the classified query, steps of:
      (a) query one or more knowledge graphs to generate a first set of responses corresponding to the set of natural language queries; and
      (b) update, by the KGU-NL Agent, the one or more knowledge graphs to generate a second set of responses corresponding to the set of natural language queries,
   wherein the one or more knowledge graphs are updated by the Knowledge Graph Update Agent based upon a set of information obtained from one or more users by the Knowledge Graph Engage Agent, and wherein the set of information corresponds to the processing of natural language queries.

9. The system of claim 8, wherein the logical integration comprises hierarchically defining, based upon the set of anticipated natural language user queries, the plurality of components and the one or more multi-purpose conversational agents to process the natural language queries.

10. The system of claim 9, wherein the defined plurality of components further comprise an auto-suggestion mechanism for auto-generating, based upon one or more training datasets, a plurality of recommended questions for one or more users to facilitate the processing of natural language queries.

11. The system of claim 10, wherein the one or more training datasets comprise a set of semantically similar sets of queries and a set of answers corresponding to the semantically similar sets of queries.

12. The system of claim 8, wherein the set of information is obtained from the one or more users by either a pro-active user engagement or by an analysis of information corresponding to the one or more knowledge graphs by the Knowledge Graph Engage Agent.

13. The system of claim 8, wherein the one or more processors are further configured to generate the first set of responses by:
   (i) mapping one or more entities corresponding to the one or more knowledge graphs with one or more phrases corresponding to the classified query by an inverted index based searching technique; and
   (ii) traversing, based upon the mapping, the one or more knowledge graphs to generate the first set of responses.

14. The system of claim 8, wherein the one or more processors are further configured to generate the second set of responses by either engaging the user to extract the in-depth information corresponding to the set of natural language queries or by executing a set of commands by an interface.

15. A non-transitory computer readable medium having a computer readable program, wherein the computer readable program, when executed on a computing device, causes the computing device to:
   define, by one or more processors, a plurality of components comprising a Dialogue State Manager (DSM), a Multi-level Intent Identification Component, an Agents Manager, a plurality of Primary Agents, an Intent-Action-Dialogue (IAD) Framework, a Query-Update-Engage (QUE) Framework, a Knowledge Graph Update-Natural Language (KGU-NL) Agent, a Knowledge Graph Engage Agent, a plurality of Auxiliary Agents, and a Knowledge Graph Update Agent, wherein each component amongst the plurality of components comprises one or more multi-purpose conversational agents;

logically integrate, based upon a set of anticipated natural language user queries, the plurality of components by one or more application programming interfaces (APIs);

receive, by the plurality of components logically integrated, a set of natural language queries from a plurality of sources;

perform, based upon the set of natural language queries, a plurality of steps, wherein the plurality of steps comprise:
  (i) identifying at least one multi-purpose conversational agent amongst the one or more multi-purpose conversational agents by using the DSM, wherein the identified multi-purpose conversational agent corresponds to either the IAD Framework or the QUE Framework; and
  (ii) predicting, by using one or more Deep Learning techniques, a probable user intent against a user query amongst the set of non-classified natural language queries;

perform, based upon the predicted user intent and the identified multi-purpose conversational agent, steps of:
  (i) a selecting one or more pre-defined set of responses amongst a plurality of pre-defined set of responses or engaging a user for extracting in-depth information or calling external APIs for communicating the in-depth information to one or more external services upon determining the identified multi-purpose conversational agent to be corresponding to the IAD Framework, wherein the one or more pre-defined set of responses and the in-depth information correspond to the set of natural language queries;
  (ii) classifying a query amongst the set of natural language queries to identify one or more categories of conversations by implementing a recurrent neural network technique upon determining the identified multi-purpose conversational agent to be corresponding to the QUE Framework; and
  (iii) performing, based upon the classified query, steps of:
    (a) querying one or more knowledge graphs to generate a first set of responses corresponding to the set of natural language queries; and
    (b) updating, by the KGU-NL Agent, the one or more knowledge graphs to generate a second set of responses corresponding to the set of natural language queries, wherein the one or more knowledge graphs are updated by the Knowledge Graph Update Agent based upon a set of information obtained from one or more users by the Knowledge Graph Engage Agent, and wherein the set of information corresponds to the processing of natural language queries.

* * * * *